United States Patent
Sorensen et al.

(10) Patent No.: US 10,862,382 B2
(45) Date of Patent: Dec. 8, 2020

(54) HYDRAULIC STEERING ARRANGEMENT

(71) Applicant: Danfoss Power Solutions ApS, Nordborg (DK)

(72) Inventors: Ole Falck Sorensen, Nordborg (DK); Jorgen Krusborg, Nordborg (DK); Soren Winkler Rasmussen, Nordborg (DK); Caspar Pilkington Laugesen, Nordborg (DK)

(73) Assignee: Danfoss Power Solutions ApS, Nordborg (DK)

( * ) Notice: Subject to any disclaimer, the term of this patent is extended or adjusted under 35 U.S.C. 154(b) by 294 days.

(21) Appl. No.: 16/100,758

(22) Filed: Aug. 10, 2018

(65) Prior Publication Data

US 2019/0052159 A1 Feb. 14, 2019

(30) Foreign Application Priority Data

Aug. 14, 2017 (DE) .................. 10 2017 118 457

(51) Int. Cl.
- *H02K 29/12* (2006.01)
- *B62D 15/02* (2006.01)
- *G01D 5/20* (2006.01)
- *B62D 5/06* (2006.01)

(52) U.S. Cl.
CPC ......... *H02K 29/12* (2013.01); *B62D 15/0215* (2013.01); *G01D 5/2073* (2013.01); *B62D 5/06* (2013.01)

(58) Field of Classification Search
CPC ...... H02K 29/12; B62D 15/0215; B62D 5/06; G01D 5/2073
See application file for complete search history.

(56) References Cited

U.S. PATENT DOCUMENTS

| | | | |
|---|---|---|---|
| 5,625,239 A | 4/1997 | Persson et al. | |
| 5,896,942 A * | 4/1999 | Bohner | B62D 5/006 180/402 |
| 6,107,767 A * | 8/2000 | Lu | B62D 5/046 318/432 |

(Continued)

FOREIGN PATENT DOCUMENTS

| CN | 1877920 A | 12/2006 |
|---|---|---|
| CN | 102414539 A | 4/2012 |

(Continued)

OTHER PUBLICATIONS

Konrad Reof, "Sensorem im Kraftfahrzeug," p. 37-41, (2012) with English translation of pertinent lines.

*Primary Examiner* — Ruth Ilan
*Assistant Examiner* — Michael R Stabley
(74) *Attorney, Agent, or Firm* — McCormick, Paulding & Huber PLLC

(57) ABSTRACT

A hydraulic steering arrangement is described comprising a steering unit (1), a steering wheel and a steering wheel angle sensor (3) detecting an angle of rotation between the steering wheel and the steering unit (1). Such a steering arrangement should have a simple construction. To this end the steering wheel angle sensor (3) comprises a transmitter/receiver arrangement fixed to the steering unit (1) and a target assembly (4) which is rotateably fixed to the steering wheel by means of a connection geometry (9) and comprises a passive reaction arrangement.

20 Claims, 2 Drawing Sheets

(56) References Cited

U.S. PATENT DOCUMENTS

| | | | | |
|---|---|---|---|---|
| 7,295,907 | B2 * | 11/2007 | Lu | B62D 15/0235 |
| | | | | 116/31 |
| 7,350,617 | B2 * | 4/2008 | Lausser | B62D 6/10 |
| | | | | 180/444 |
| 7,725,227 | B2 * | 5/2010 | Pattok | B62D 5/0472 |
| | | | | 701/41 |
| 2006/0065473 | A1 * | 3/2006 | Lausser | B62D 6/10 |
| | | | | 180/444 |
| 2018/0142772 | A1 * | 5/2018 | Lee | F16H 55/17 |

FOREIGN PATENT DOCUMENTS

| | | | |
|---|---|---|---|
| CN | 105226475 A | | 1/2016 |
| CN | 106605133 A | | 4/2017 |
| DE | 19738836 A1 | | 3/1999 |
| DE | 10222318 A1 | | 11/2003 |
| DE | 102004056049 A1 | | 6/2006 |
| DE | 10 2007 022 282 A1 | | 11/2008 |
| DE | 102008062416 A1 | | 7/2010 |
| DE | 102013225921 A1 | | 7/2015 |
| EP | 2 884 236 A1 | | 6/2015 |
| KR | 10-0765087 B1 | | 10/2007 |

* cited by examiner

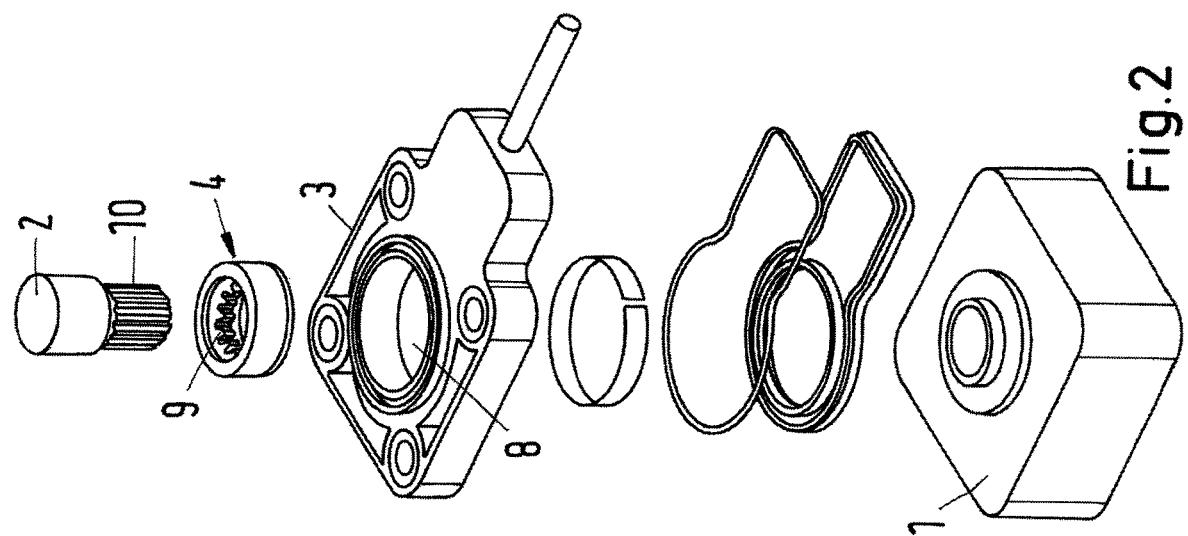
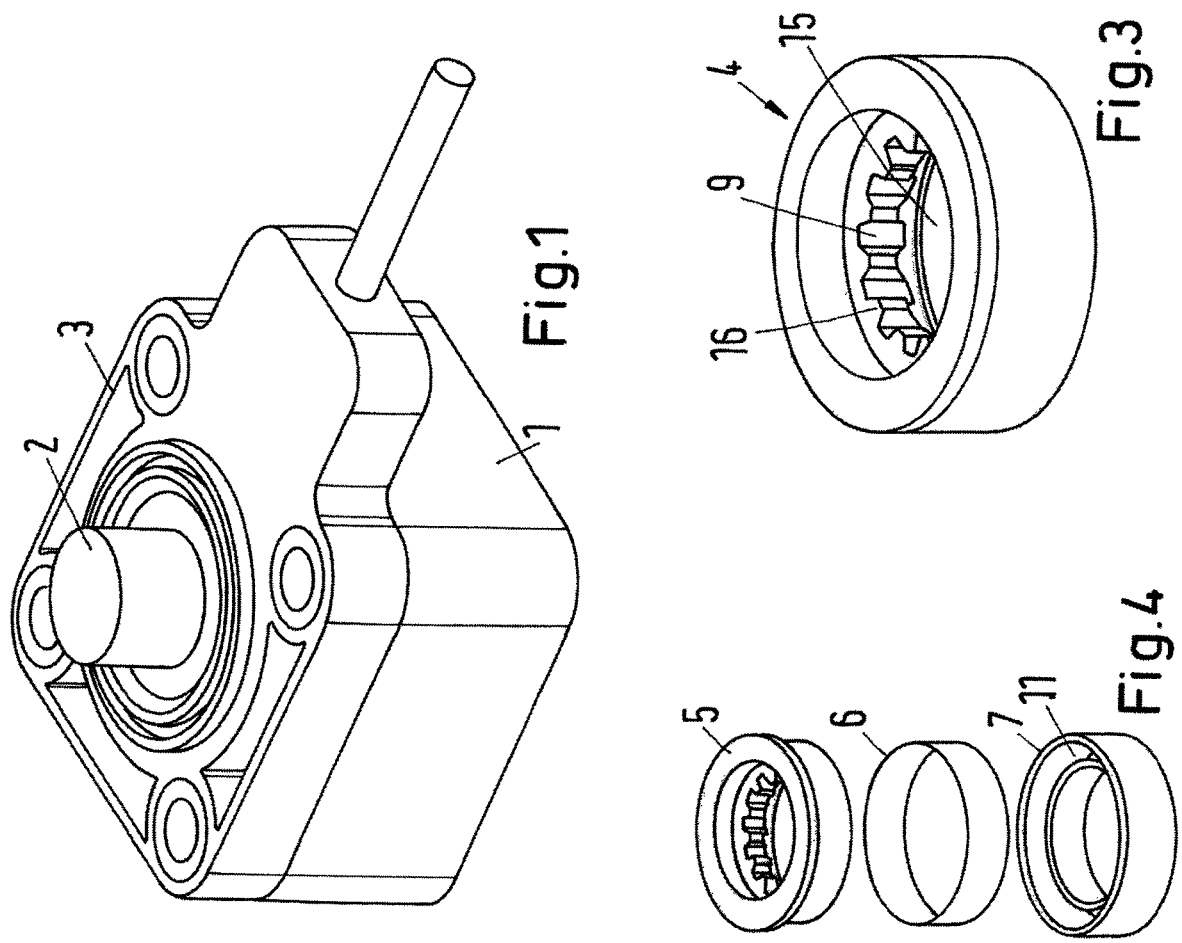

HYDRAULIC STEERING ARRANGEMENT

CROSS-REFERENCE TO RELATED APPLICATION

This application claims foreign priority benefits under U.S.C. § 119 to German Patent Application No. DE 102017118457.0 filed on Aug. 14, 2017, the content of which is hereby incorporated by reference in its entirety.

TECHNICAL FIELD

The present invention relates to a hydraulic steering arrangement comprising a steering unit, a steering wheel, and a steering wheel angle sensor detecting an angle of rotation between the steering wheel and the steering unit.

BACKGROUND

In some cases a vehicle equipped with such a steering arrangement comprises in addition to the steering unit a steering valve section so that the vehicle can be steered by the steering wheel on the one hand and remotely on the other hand. The remote steering can be accomplished, for example, by means of GPS data. The remote steering can also be named automatic steering.

When during automatic steering it is necessary that the driver takes over control over the vehicle by actuating the steering wheel, for example in an emergency situation, it is necessary that the steering arrangement "knows" the angular position of the steering wheel. To this end the steering wheel angle sensor is used.

SUMMARY

The object underlying the invention is to provide a steering arrangement having a simple construction.

This object is solved in a hydraulic steering arrangement as described at the outset in that the steering wheel angle sensor comprises a transmitter/receiver arrangement fixed to the steering unit and a target assembly which is rotateably fixed to the steering wheel by means of a connecting geometry and comprises a passive reaction arrangement.

In such a hydraulic steering arrangement the transmitter/receiver arrangement which forms the active parts of the steering wheel sensor is arranged stationary at the steering unit and only passive parts are fixed to the steering wheel and rotate with the steering wheel. It is, for example, possible to use a transmitter/receiver arrangement which generates an electrical field with a high frequency to produce a resonance reaction in the target. When the target is excited to resonate, it generates a counter field which can be received by the receiver of the transmitter/receiver arrangement. The received signal can be divided in a sine part and a co-sine part. From these two parts of the signal it is possible to detect the angle of the steering wheel relative to the steering unit. The connection geometry is used to connect the target to the steering wheel or to a steering wheel shaft. The only requirement is that the connection geometry fixes the target in rotational direction to the steering wheel.

In a preferred embodiment the connection geometry is exchangeable. In this way it is possible to adapt the steering wheel sensor to different steering wheel shafts which may have different counter geometries to be engaged with the connection geometry. The rest of the steering wheel angle sensor can remain unchanged.

In an embodiment of the invention the connecting geometry is arranged in an adapter ring. In this case it is only necessary to change the adapter ring when an adaption of the steering wheel angle sensor to different steering wheel shafts is necessary.

In an embodiment of the invention the connection geometry comprises a hole surrounded by a teeth arrangement. The hole is used to accommodate the steering wheel shaft. The teeth arrangement comes into engagement with a corresponding teeth arrangement on the steering wheel shaft so that a fixation against rotation is given.

In an embodiment of the invention the target assembly comprises a coil arranged on a flexible carrier, wherein the carrier is mounted in a groove of the target assembly. The coil forms the above mentioned passive reaction arrangement. When this coil is excited by an external electrical field with a frequency corresponding to a resonance frequency of the coil, the coil generates a counter field which can be detected by the receiver of the transmitter/receiver arrangement. The coil on the flexible carrier can be in the same form for all connection geometries. Therefore, even if a connection geometry is replaced by another connection geometry, no recalibration of the steering wheel angle sensor is necessary as long as the same coil on the flexible carrier is used.

In an embodiment of the invention a radially inner wall of the groove is provided with a succession of protrusion and recesses, wherein the flexible carrier is supported by the protrusions. The protrusions define the inner diameter of the coil. In other words, the inner diameter of the coils is the same for all target assemblies of the same kind.

In an embodiment of the invention the groove is filled with a potting material. The potting material fixes the flexible carrier in the groove and at the same time protects the carrier and the coil against humidity or other negative conditions from the outside.

In an embodiment of the invention the connecting geometry comprises at least three spring fingers protruding radially inwardly. In order to bring the target into an engagement with the steering wheel shaft, the connection geometry must be slightly larger than the counter geometry on the steering wheel shaft. This may have the drawback that there can be a small play between the connection geometry and the steering wheel shaft. The spring fingers give a simple possibility to reduce or eliminate such a play. The spring fingers are pressed against the steering wheel shaft with a certain pretension having the result that the target can no longer move with respect to the steering shaft.

In an embodiment of the invention the spring fingers are part of a spring ring fixed in circumferential direction to the target assembly. The use of a spring ring is a simple way to position the spring fingers in the target.

In an embodiment of the invention the spring ring is locked in the target assembly by means of a locking ring. In this way the target comprises at least two parts namely the adapter ring itself and the locking ring. The spring ring is held between these two parts.

In another embodiment of the invention the spring ring is molded in the target assembly. In this case the spring ring is positioned in the target assembly when the adapter ring is molded.

BRIEF DESCRIPTION OF THE DRAWINGS

The embodiments of the invention will now be described in more detail with reference to the drawing, wherein:

FIG. 1 is a perspective view of parts of a hydraulic steering arrangement,

FIG. 2 is an exploded view of the parts shown in FIG. 1,

FIG. 3 is an enlarged view of the target assembly,

FIG. 4 is an exploded view of the target assembly,

DETAILED DESCRIPTION

Figure 5:
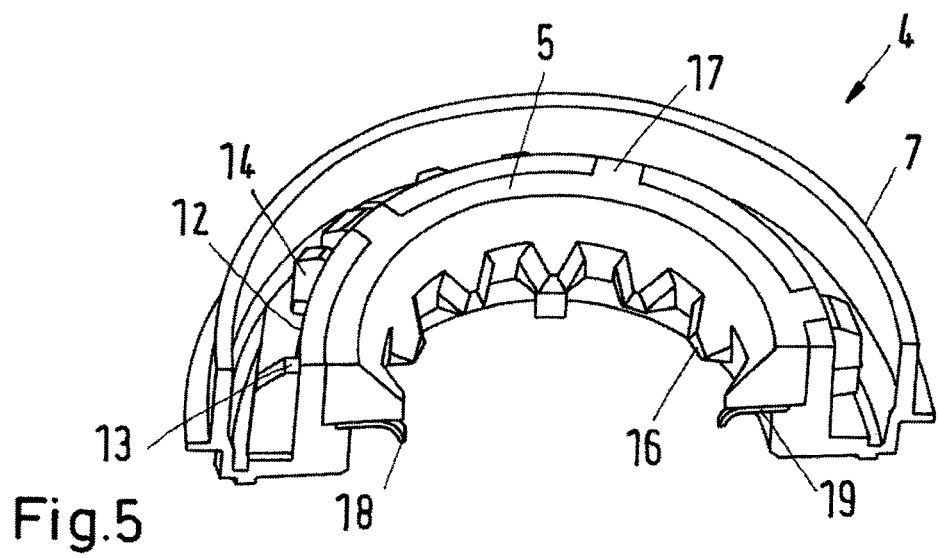
FIG. 5 is a first embodiment of parts of the target assembly.

FIG. 1 shows schematically a steering unit 1, a shaft 2 of a steering wheel (not shown) and a steering wheel angle sensor 3. The steering wheel angle sensor 3 detects an angle of rotation between the steering wheel shaft 2 and the steering unit.

The steering unit 1 and the steering wheel shaft 2 together with the steering wheel and the steering wheel angle sensor 3 together form parts of a steering arrangement.

FIG. 2 shows the parts of FIG. 1 in an exploded view. In all figures the same elements are denoted with the same reference numerals.

The steering wheel sensor 3 comprises a target 4. As it is shown in FIGS. 3 and 4, the target 4 comprises an adapter ring 5, a flexible carrier 6, and a target ring 7. The carrier 6 bears a coil which form a passive reaction arrangement.

In a mounted condition (FIG. 1) the target 4 is accommodated in a bore 8 of the steering wheel angle sensor 3. In a way not shown the steering wheel angle sensor 3 comprises a transmitter/receiver arrangement having at least an exciting coil as transmitting means and a couple of receiving coils as receiving means. For further details it is referred to U.S. Pat. No. 5,625,239, the disclosure of which is incorporated here by reference.

Consequently, the target 4 is a passive reaction arrangement having no active parts. When the exciting coil is supplied with a voltage of a high frequency, e. g. 2 MHz, it generates an electrical field including a current in the coil on the flexible carrier 6. This current produces a counter field which is detected by the receive coils.

The target 4 comprises a connection geometry 9. In the embodiment shown in FIGS. 3 and 4 the connection geometry 9 is part of the adapter ring 5. The adapter ring 5 is removable from the target ring 7. However, in other embodiments, it can be permanently connected to the target ring 7.

In any case, the connection geometry 9 is easily exchangeable. Therefore, the steering wheel angle sensor 3 can easily be adapted to different counter geometries 10 on the steering wheel shaft 2. When the connection geometry 9 is part of a separate adapter ring 5, it is sufficient to exchange the adapter ring 5. If the adapter ring 5 is permanently connected to the target ring 7 or is in otherwise fixed to the target 4, it is possible to replace a specific target 4 by another target 4.

The flexible carrier 6 with the coil arrangement is accommodated in a groove 11 of the target 4. In the embodiment shown in FIG. 4, this groove 11 is part of the target ring 7. The groove 11 has a radially inner diameter which defines the inner diameter of the flexible carrier 6. The flexible carrier 6 can be elastically deformable to a certain extent so that the length of the coil on the flexible carrier 6 can be rather precisely adapted to the desired diameter. In this way it is easily possible to exchange the target 4 without having the necessity to recalibrate the steering wheel angle sensor 3.

Figure 7:
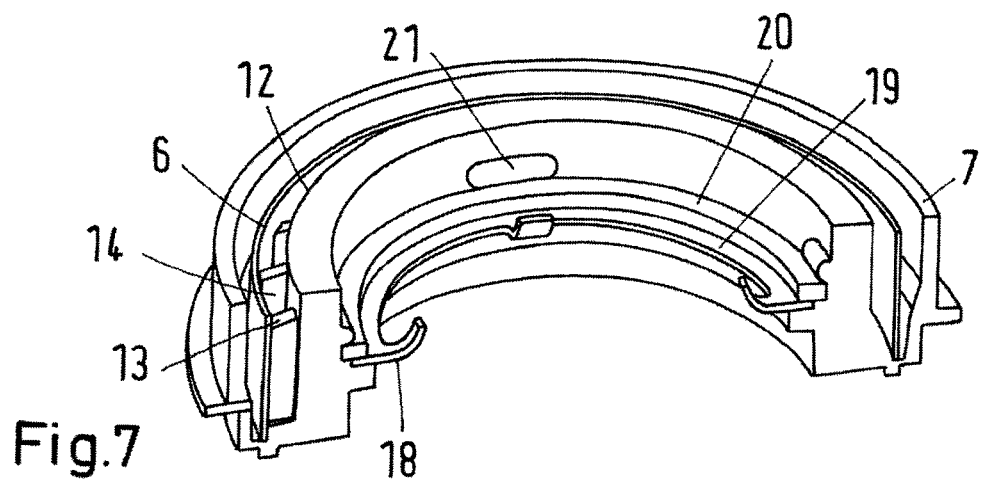
FIG. 7 is a third embodiment of parts of the target assembly.

In an embodiment shown in FIGS. 5 and 7, the groove has a radially inner wall 12 which is provided with a succession of protrusions 13 and recesses 14, in other words a tooth-like structure. The flexible carrier 6 rests on the protrusions which define the radially inner diameter of the flexible carrier 6.

The structure with protrusions 13 and recesses 14 makes it possible to fill the groove 11 with a potting material thereby protecting the flexible carrier against humidity and other influences from the environment.

The connection geometry 9 comprises a hole 15 surrounded by a teeth arrangement 16. The teeth arrangement 16 is adapted to the counter geometry 10.

FIG. 5 shows a first embodiment of the target 4 from the bottom. The adapter ring 5 is a part separate from the target ring 7. The adapter ring 5 comprises a number of notches 17 pointing radially outwardly and being in engagement with the inner wall 12 of the target ring 7.

A number of spring fingers 18 are evenly distributed in circumferential direction. Each spring finger 18 is located at the position of a tooth of the teeth arrangement 16. The spring fingers 18 protrude radially inwardly over the teeth of the teeth arrangement 16 to establish a contact with the counter geometry 10 with a certain pretension.

The spring fingers 18 are part of a spring ring 19 (FIG. 7). The spring ring 19 is clamped between the adapter ring 5 and the target ring 7.

Since the spring fingers 18 bear with a certain pretension against the counter geometry 10, in the mounted condition there is no movement possible between the target 4 and the steering wheel shaft 2.

Figure 6:
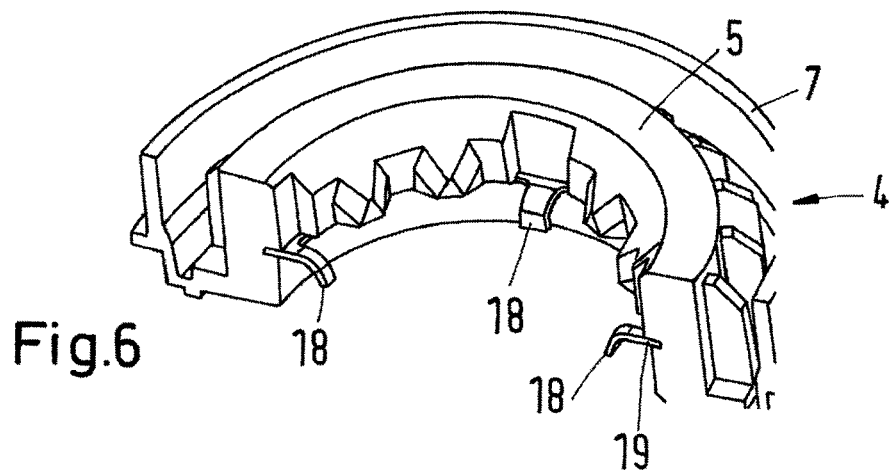
FIG. 6 is a second embodiment of parts of the target assembly.

FIG. 6 shows another embodiment in which the adapter ring 5 and the target ring 7 are formed as one single piece. The spring ring 19 with the spring fingers 18 is molded in the target assembly 4. In the embodiment shown in FIG. 6 the spring fingers are in place of teeth of the teeth arrangement 16, i. e. in a position in which a spring finger 18 is located, there is no tooth of the teeth arrangement.

FIG. 7 shows a third embodiment in which the spring ring 19 is held in the target ring 7 by means of a lock ring 20. The lock ring can be in form of a snap ring which is held between the spring ring 19 and protrusions 21 on the radial inside of the target ring 7.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic steering arrangement comprising a steering unit, a steering wheel, and a steering wheel angle sensor detecting an angle of rotation between the steering wheel and the steering unit, wherein the steering wheel angle sensor comprises a transmitter/receiver arrangement fixed to the steering unit and a target assembly which is rotatably fixed to the steering wheel by means of a connection geometry and comprises a passive reaction arrangement, and wherein the target assembly comprises a coil arranged on a flexible carrier, wherein the carrier is mounted in a groove of the target assembly.

2. The steering arrangement according to claim 1, wherein the connection geometry is exchangeable.

3. The steering arrangement according to claim 2, wherein the connection geometry is arranged in an adapter ring.

4. The steering arrangement according to claim 3, wherein the connection geometry comprises a hole surrounded by a teeth arrangement.

5. The steering arrangement according to claim 3, wherein the connection geometry comprises at least three spring fingers protruding radially inwardly.

6. The steering arrangement according to claim 2, wherein the connection geometry comprises a hole surrounded by a teeth arrangement.

7. The steering arrangement according to claim 2, wherein the connection geometry comprises at least three spring fingers protruding radially inwardly.

8. The steering arrangement according to claim 1, wherein the connection geometry comprises a hole surrounded by a teeth arrangement.

9. The steering arrangement according to claim 8, wherein the connection geometry comprises at least three spring fingers protruding radially inwardly.

10. The steering arrangement according to claim 1, wherein a radially inner wall of the groove is provided with a succession of protrusions and recesses, wherein the flexible carrier is supported by the protrusions.

11. The steering arrangement according to claim 10, wherein the groove is filled with a potting material.

12. The steering arrangement according to claim 1, wherein the groove is filled with a potting material.

13. The steering arrangement according to claim 1, wherein the connection geometry comprises at least three spring fingers protruding radially inwardly.

14. The steering arrangement according to claim 13, wherein the spring fingers are part of a spring ring fixed in circumferential direction to the target assembly.

15. The steering arrangement according to claim 14, wherein the spring ring is locked in the target assembly by means of a lock ring.

16. The steering arrangement according to claim 14, wherein the spring ring is molded in the target assembly.

17. A hydraulic steering arrangement comprising a steering unit, a steering wheel, and a steering wheel angle sensor detecting an angle of rotation between the steering wheel and the steering unit, wherein the steering wheel angle sensor comprises a transmitter/receiver arrangement fixed to the steering unit and a target assembly which is rotatably fixed to the steering wheel by means of a connection geometry and comprises a passive reaction arrangement, and wherein the connection geometry comprises at least three spring fingers protruding radially inwardly.

18. The steering arrangement according to claim 17, wherein the spring fingers are part of a spring ring fixed in circumferential direction to the target assembly.

19. The steering arrangement according to claim 18, wherein the spring ring is locked in the target assembly by means of a lock ring.

20. The steering arrangement according to claim 18, wherein the spring ring is molded in the target assembly.

\* \* \* \* \*